United States Patent
Ito et al.

(10) Patent No.: US 8,258,729 B1
(45) Date of Patent: Sep. 4, 2012

(54) DOWN SAMPLING METHOD FOR HARD DISK SPEED CONTROL LOOP

(75) Inventors: Kiyotada Ito, Hiratsuka (JP); Takahiro Inoue, Chigasaki (JP); Foo Leng Leong, Singapore (SG)

(73) Assignee: Marvell International Ltd., Hamilton (BM)

( * ) Notice: Subject to any disclaimer, the term of this patent is extended or adjusted under 35 U.S.C. 154(b) by 461 days.

(21) Appl. No.: 12/629,575

(22) Filed: Dec. 2, 2009

Related U.S. Application Data

(60) Provisional application No. 61/139,862, filed on Dec. 22, 2008.

(51) Int. Cl.
*H02P 6/16* (2006.01)
*G05B 11/01* (2006.01)

(52) U.S. Cl. .................. 318/400.04; 318/560; 318/561; 369/53.34

(58) Field of Classification Search ............ 318/400.04, 318/400.05, 400.09, 560–562; 360/77.02; 369/47.48, 53.34
See application file for complete search history.

(56) References Cited

U.S. PATENT DOCUMENTS

| | | | |
|---|---|---|---|
| 5,486,744 A * | 1/1996 | Watanabe | 318/560 |
| 5,780,986 A * | 7/1998 | Shelton et al. | 318/432 |
| 6,208,280 B1 * | 3/2001 | Baker et al. | 341/152 |
| 6,665,134 B2 * | 12/2003 | Ottesen et al. | 360/31 |
| 6,683,833 B2 * | 1/2004 | Dekker et al. | 369/44.29 |
| 6,738,205 B1 * | 5/2004 | Moran et al. | 360/17 |
| 6,759,827 B2 * | 7/2004 | Kawashima | 318/727 |
| 7,038,987 B2 * | 5/2006 | Takahashi | 369/53.34 |
| 7,466,093 B2 * | 12/2008 | Otaguro | 318/400.09 |
| 7,561,369 B2 * | 7/2009 | Usui et al. | 360/77.02 |
| 2001/0005342 A1 * | 6/2001 | Dekker et al. | 369/47.48 |
| 2002/0047683 A1 * | 4/2002 | Kawashima | 318/721 |
| 2002/0171386 A1 * | 11/2002 | Kelly et al. | 318/599 |
| 2002/0191314 A1 * | 12/2002 | Ottesen et al. | 360/31 |
| 2003/0086348 A1 * | 5/2003 | Takahashi | 369/53.34 |
| 2007/0031131 A1 * | 2/2007 | Griffitts | 388/811 |
| 2008/0143313 A1 * | 6/2008 | Tang et al. | 323/299 |
| 2008/0218107 A1 * | 9/2008 | Otaguro | 318/400.05 |
| 2008/0297942 A1 * | 12/2008 | Usui et al. | 360/77.02 |

* cited by examiner

*Primary Examiner* — Paul Ip

(57) ABSTRACT

Systems, methods and computer program products for removing speed adjustment errors attributed by pole asymmetry are described. In some implementations, the spindle motor speed can be down sampled. Down sampling the spindle motor speed can include determining the spindle motor speed every two (or multiple of two) electrical cycles. Determining the spindle motor speed every two electrical cycles can lead to an accurate determination of the actual spindle motor speed, as the timing and position differences between two adjacent poles can be equalized (e.g., timing and position errors associated with the second pole can be used to cancel out the timing and position characteristics errors with the first pole).

21 Claims, 8 Drawing Sheets

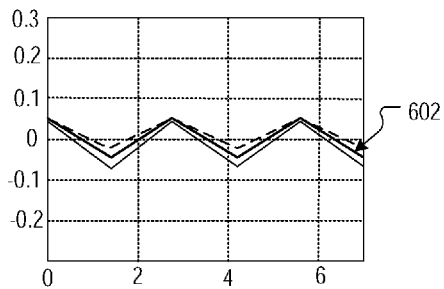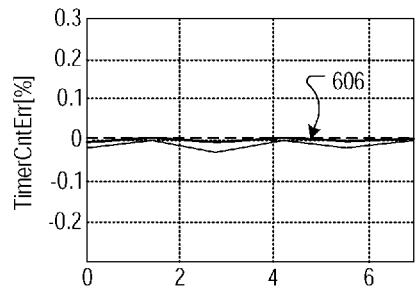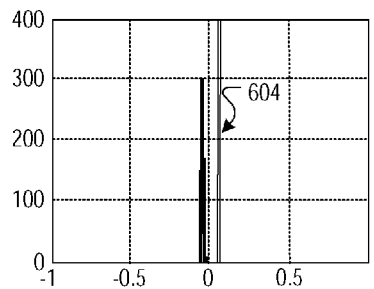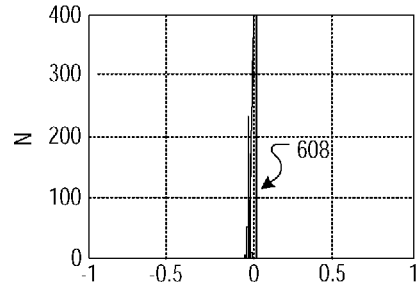
FIG. 6A                    FIG. 6B

DOWN SAMPLING METHOD FOR HARD DISK SPEED CONTROL LOOP

CROSS-REFERENCE TO RELATED APPLICATIONS

This application claims priority to U.S. Provisional Application Ser. No. 61/139,862 titled "DOWN SAMPLING METHOD FOR HARD DISK SPEED CONTROL LOOP," filed on Dec. 22, 2008, the disclosure of which is incorporated herein by reference in its entirety.

TECHNICAL FIELD

The subject matter of this application is generally related to hard disks.

BACKGROUND

A disc drive is a data storage device used to store digital data. A typical disc drive includes a number of rotatable recording discs (optical or magnetic) which are axially aligned and mounted to a spindle motor for rotation at a high constant velocity. A corresponding array of read/write heads access tracks on the respective disc surfaces to write data to or read data from the discs.

A spindle motor is typically provided with a four-pole or six-pole motor configuration. Phase coils or windings are arranged about a stationary stator on a number of radially distributed stator poles. A rotatable spindle motor is provided with a number of circumferentially extending permanent magnets in close proximity to the stator poles. Application of current to the stator windings induces electromagnetic fields (called BEMF or back electromotive force) which interact with the magnetic fields of the magnets to apply torque to the spindle motor and induce rotation of the discs.

Controlling the spindle motor speed at which the spindle motor operates is critically important, as erroneous speed may result in an incorrect track being read or written. In existing disc drive systems, the BEMF generated in a single winding is typically measured and provided as a feedback signal to control the spindle motor speed. In response to the feedback signal, a spindle motor speed control system is used to modify the current flow in the stator windings to produce the necessary torque for rotating the spindle motor at a desired speed.

SUMMARY

Systems, methods and computer program products for removing speed adjustment errors attributed to pole asymmetry are described. In some implementations, the spindle motor speed can be down sampled. Down sampling the spindle motor speed can include determining the spindle motor speed every two electrical cycles. Determining the spindle motor speed every two electrical cycles can lead to an accurate determination of the actual spindle motor speed, as the timing and position differences between two adjacent poles can be equalized (e.g., timing and position errors associated with the second pole can be used to cancel out the timing and position characteristics errors with the first pole).

In some implementations, a method can be provided that includes down sampling a rotational speed of a spindle motor every two or multiple of two electrical cycles to obtain speed-related information associated with the spindle motor, and adjusting the rotational speed based on the speed-related information.

In some implementations, a spindle motor controller can be provided that includes a down sample module to down sample a rotational speed of a spindle motor every two or multiple of two electrical cycles to obtain speed-related information associated with the spindle motor, and a speed adjustment module to adjust the rotational speed based on the speed-related information.

In some implementations, a system can be provided that includes a spindle motor having a plurality of poles, and a spindle motor controller to control the spindle motor, the spindle motor controller configured to: down sample a rotational speed of a spindle motor every two or multiple of two electrical cycles to obtain speed-related information associated with the spindle motor; and adjust the rotational speed based on the speed-related information.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 6A shows example results of spindle motor speed control implemented without down sampling spindle motor speed.

FIG. 6B shows example results of spindle motor speed control implemented with down sampling spindle motor speed.

Like reference symbols in the various drawings indicate like elements.

DETAILED DESCRIPTION

Overview

Figure 1:
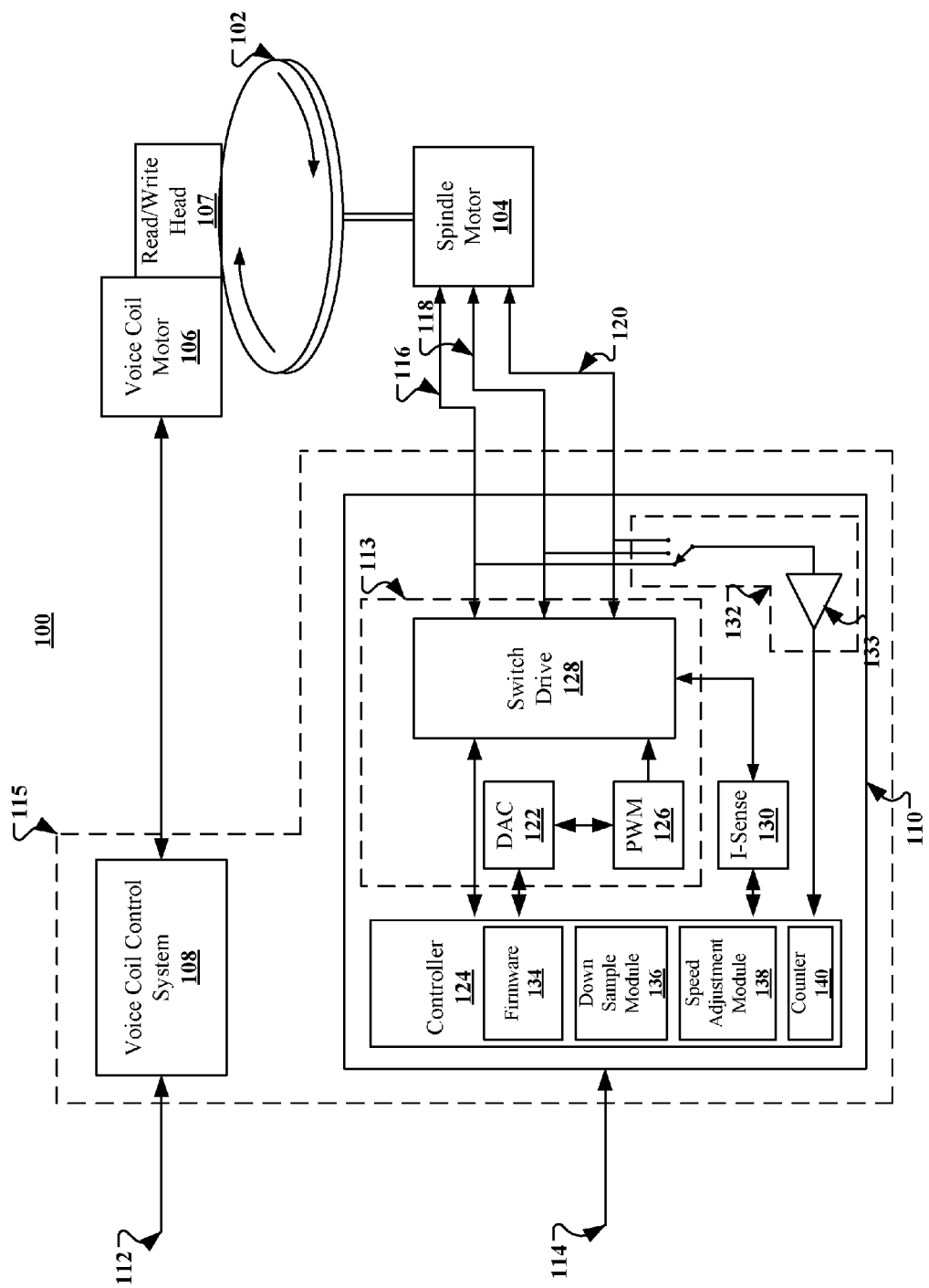
FIG. 1 is a schematic block diagram of an example disc drive system.

To determine the speed (and position) of a spindle motor, zero crossings of the BEMF can be obtained with each passing of a rotor pole with respect to a stator pole. Each time a zero crossing is detected, the rotor advances in its commutation sequence by, for example, 30, 60 or 90 electrical degrees, depending on the number of stator or rotor poles. Because the number of poles and their respective positions are known, the speed of the spindle motor can be determined based on the zero crossings.

However, in practice, it is difficult during the manufacturing process to symmetrically position the poles (rotor or stator poles) to ensure evenly distributed angular spacing between the poles (e.g., for a motor with six poles, the angular spacing between the poles may be different than the desired value of $\pi/3$). Irregular pole spacing or pole asymmetry can cause uneven timings between BEMF zero crossings even though the spindle speed may be constant or operate at a target speed. For example, a short electrical pole may cause a zero crossing to be detected prematurely (which may indicate to the speed control logic that the spindle motor speed has exceeded the target speed). As another example, a long electrical pole may prolong the detection of a zero crossing (which may indicate to the speed control logic that the spindle motor speed is below the target speed). When speed compensation is performed, such a compensation may lead to over-compensation or under-compensation, as the speed variation is attributed to pole asymmetry and not the actual deviation in the current rotational speed from the target speed.

In order to drive the spindle motor in a manner that is controlled either in speed, in torque, or in position, it is essential to control the poles synchronously with the mechanical position of the rotor and minimize the effects of pole asymmetry that can give rise to timing and position errors that are detrimental to the determination of the actual speed of the spindle motor. To eliminate or substantially reduce speed adjustment errors attributed by pole asymmetry, in some implementations, the spindle motor speed can be down sampled. Down sampling the spindle motor speed can include determining the spindle motor speed every two electrical cycles. For example, for a six-pole motor, the spindle motor speed can be determined after the second pole. Determining the spindle motor speed every two electrical cycles can result in an accurate determination of the actual spindle motor speed, because timing and position differences between two adjacent poles can be equalized as will be discussed in greater detail below (e.g., timing and position characteristics associated with the second pole can be used to balance or cancel out the timing and position characteristics associated with the first pole).

Further, down sampling the spindle motor speed allows the number of speed adjustments to be reduced. Because pole asymmetry can cause the spindle motor to adjust speed frequently, down sampling the spindle motor speed can minimize unnecessary oscillation of the digital-to-analog converter (DAC) caused by the frequent speed adjustment. Minimizing oscillation of the DAC helps stabilize the DAC such that velocity errors generated by the DAC can be reduced and the speed velocity can be maintained at a constant, steady rate.

System Overview

FIG. 1 is a schematic block diagram of an example disc drive system 100. Disc drive system 100 can include a rotatable storage medium 102 that can be rotated by a spindle motor 104. A read/write head 107 can be suspended close to the storage medium 102, and a voice coil motor 106 can be used to control the motion of the read/write head 107. The read/write head 107 can move radially to read data from or write data to different tracks on the storage medium 102. Movement information associated with the read/write head 107 can be fed to a voice coil control system 108 (via the voice coil motor 106), which also can control the manner in which the read/write head 107 writes and reads information to and from the storage medium 102. The voice coil control system 108 can control the motion of the read/write head 107 responsive to input commands 112 (e.g., read commands and write commands) received from a CPU-based system, embedded controller, microcontroller, or the like.

Rotation of the storage medium 102 is dependent on the rotation of the spindle motor 104. The spindle motor 104 can be controlled by a spindle motor control system 110. The spindle motor control system 110 can be configured to respond to input commands 114 (or input commands 112) received from a CPU-based system, embedded controller, microcontroller, or the like. The voice coil control system 108 and the spindle motor control system 110 can be implemented in a monolithic format as a single hard disk drive controller module 115. Alternatively, the voice coil control system 108 and the spindle motor control system 110 can be implemented as discrete modules and/or with discrete system components.

In the disc drive system 100, the spindle motor control system 110 can operate to control the rotation of the spindle motor 104 in response to inductive sensing of the spindle motor rotation. Although this functionality can be accomplished in a number of different manners, the spindle motor control system 110 can include a motor drive system 113 that can be configured to provide pulse width modulated signals 116, 118, and 120 to drive the spindle motor 104. The spindle motor 104 can be in the form of a three-phase Y-connected stator winding with a six pole pair permanent magnet. In such a configuration, each minimum possible step angle can be 360°/(6×6)=10°, which can correspond to the minimum movement that the spindle motor 104 can advance by applying voltages to its three phases. This configuration also can employ six voltage combinations (or states) to drive the spindle motor 104. In this combination, six electrical states each corresponding to one electrical cycle can be used to drive the spindle motor 104 through a mechanical rotation of 60°. Depending on the configuration of the spindle motor 104, a larger or fewer number of electrical cycles also can be employed.

The spindle motor control system 110 can include a digital-to-analog converter (DAC) 122 that receives data from a controller 124 to provide one or both of a carrier signal and/or modulator signal to a pulse width modulator (PWM) 126. The switched pulse width modulated signals can be provided from the PWM 126 to the input of a switch drive circuit 128. The switch drive circuit 128, in turn, can generate switched pulse width modulated signals 116, 118, and 120 to control the spindle motor 104. A current sense circuit 130 can be included to monitor the drive current flowing to the spindle motor 104. Specifically, the current sense circuit 130 can selectively detect the drive current provided by the switch drive circuit 128 (via switched pulse width modulated signals 116, 118, and 120) during the various electrical cycles such that the drive current can be measured independently during each electrical cycle. Based on the detection, the current sense circuit 130 can provide one or more signals indicative of the value of the drive current to the controller 124. The signals generated by the current sense circuit 130 can be in the form of analog, digital or the like.

At high rates of rotation, the position of the spindle motor 104 can be determined by sensing the BEMF signals from the spindle motor 104. A BEMF sensing circuit 132 can be provided to selectively sense the BEMF signals associated with the switched pulse width modulated signals 116, 118, and 120, and can provide one or more signals to the controller 124 that can be indicative of the value of a selected BEMF signal. The BEMF sensing circuit 132 can include a comparator 133 for comparing the sensed BEMF signals to a predetermined reference, and correspondingly outputting one or more signals to the controller 124. The predetermined reference need not be a fixed value, and may directly correlate with the centre tap of the three-phase Y-connected stator winding. The signals generated by the comparator 133 can be in the form of analog signals, digital signals or the like. The controller 124 can use the signals generated by the comparator 133 to control the speed of the spindle motor 104 to ensure that reading and writing operations are performed properly.

In some implementations, the controller 124 can include a down sample module 136, a speed adjustment module 138 and an electrical cycle counter 140. The electrical cycle counter 140 can be used to count the number of electrical cycles since the passage of a reference pole, and therefore to identify the current electrical cycle associated with the current pole. The electrical cycle counter 140 can transmit the counter information to the down sample module 136. When the counter information indicates that two or more (e.g., even) electrical cycles have been reached, the down sample module 136 can down sample a rotational speed of the spindle motor 104 to obtain speed-related information associated with the spindle motor 104 (e.g., via the BEMF sensing circuit 132). Based on the speed-related information, the speed adjustment module 138 can generate control signals to control the rotational speed of the spindle motor 104 (e.g., via the motor drive system 113 and pulse width modulated signals 116, 118, and 120).

The controller 124 can be implemented in hardware, or a combination of hardware and code, to control the operation of the motor drive system 113 and the spindle motor control system 110. For example, the controller 124 can include firmware 134 that can be executed by the controller 124 to direct and manage the general operation of the motor drive system 113. As another example, the firmware 134 can be executed by the controller 124 to implement a number of different functions that can be executed by the spindle motor control system 110 to properly drive the spindle motor 104.

Spindle Motor

Figure 2:
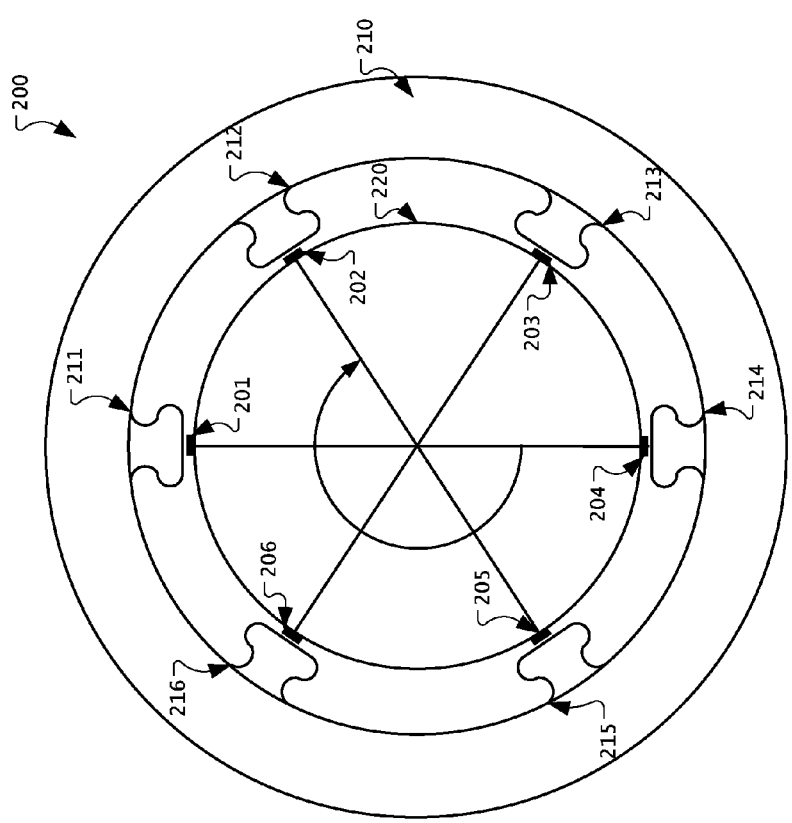
FIG. 2 shows an example of a desired pole placement of poles in a spindle motor.

FIG. 2 shows an example of a desired pole placement of poles in a spindle motor 200. The spindle motor 200 may be, for example, the spindle motor 104 shown in FIG. 1. The view shown in FIG. 2 may be considered as the view of a portion of a rotor 220, which could be the platter of a disc drive (in either a plan view or a cross-sectional view) taken perpendicular to the rotational axis, or a cross-sectional view of the motor shaft taken perpendicular to the rotational axis. The stator 210 is also shown. As seen in FIG. 2, the rotor 220 can include six rotor poles 201, 202, 203, 204, 205, 206, and the stator 210 can include six stator poles 211, 212, 213, 214, 215, 216 to complement the rotor poles 201-206. Though not shown, each stator pole 211-216 includes a stator winding coiled thereon.

As the rotor poles 201-206 of the rotor 220 rotate with respect to the stator poles 211-216 and corresponding stator windings, the changing magnetic flux generates a BEMF which induces current flow on the stator poles 211-216 and associated stator windings. The induced current may be detected and used in a feedback system (e.g., BEMF sensing circuit 132) to maintain the desired rotational speed of the spindle motor 200. Additionally, the torque generated by this electromagnetic interaction causes the rotor 220 to rotate with respect to the stator 210.

The rotor poles 201-206 are equiangularly distributed, as are the stator poles 211-216. At each electrical cycle, each rotor pole 201-206 advances to the next stator pole 211-216. As a rotor pole 201-206 passes a stator pole 211-216, a BEMF waveform is generated and the BEMF waveform can be used as an indication that a rotor pole 201-206 has reached a specific stator pole 211-216 (e.g., rotor pole 201 has reached stator pole 211). The indication can function as an indication of a rotor position (and therefore speed). If the rotor poles 201-206 are in their ideal positions (e.g., spaced apart by an angular distance of $\pi/3$), the position (and speed) of the rotor 220 can be accurately determined and controlled.

Pole Asymmetry

Figure 3:
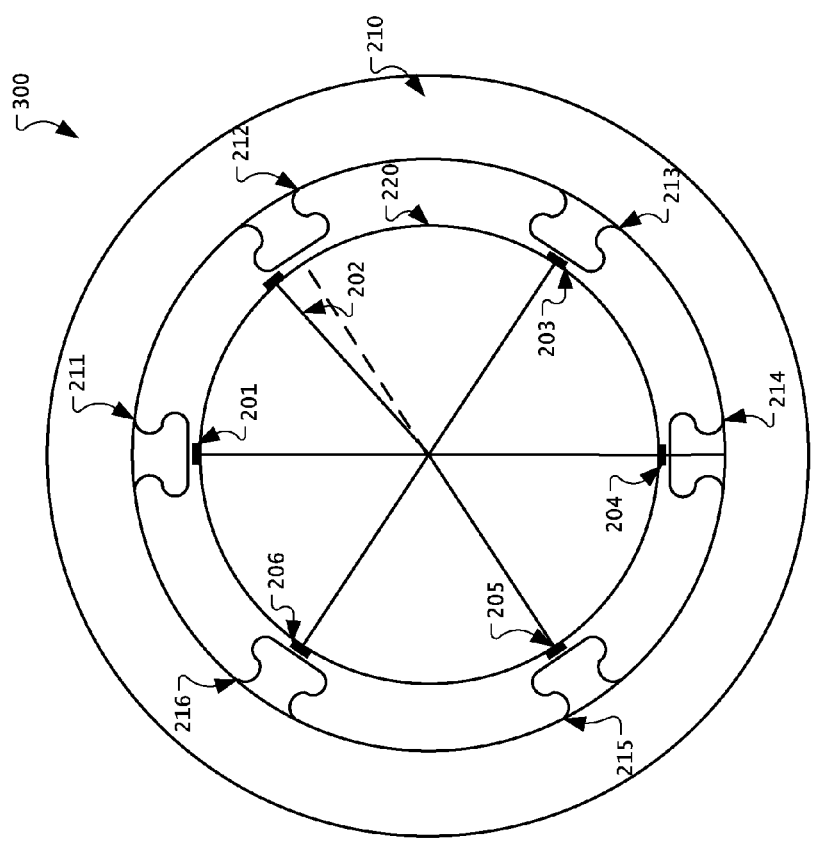
FIG. 3 shows an example of a pole displacement of poles in a spindle motor.

As discussed previously, pole asymmetry can give rise to speed adjustment errors. For example, imperfect manufacturing conditions may result in one or more rotor poles 201-206 and/or stator poles 211-216 being displaced from their respective ideal positions. Such a displacement can be an actual displacement resulting from manufacturing tolerances, or can be an effective electrical displacement resulting from differences in the windings from pole to pole. FIG. 3 shows an example of a pole displacement of poles in a spindle motor 300.

Referring to FIG. 3, the rotor 220 has six rotor poles 201-206. As shown, the rotor pole 202 is placed closer to the rotor pole 201 (e.g., with an angular spacing between pole 201 and pole 202 being less than 60°) and correspondingly further from the rotor pole 203 (e.g., with an angular spacing between pole 202 and pole 203 being greater than 60°). If rotor poles 201 and 202 are spaced symmetrically (i.e., each with an angular separation of $\pi/3$), the timings between successive BEMF pulses should also correspond to $\tau_{Ref}/6$ (where $\tau_{Ref}$ is the revolution time). However, the angular spacing between rotor poles 201 and 202 is less than $\pi/3$ so that the measured time is less than $\tau_{Ref}/6$. As a result, after the first electrical cycle, the spindle motor control loop modifies the current on the windings of the stator poles to decrease the rotational speed of the spindle motor 300, even though the spindle motor 300 is operating at the desired rotational speed. In effect, this speed adjustment moves the spindle motor speed away from the target speed, as the speed deviation is attributed to pole asymmetry and not the actual deviation in the current rotational speed from the target speed.

Figure 4:
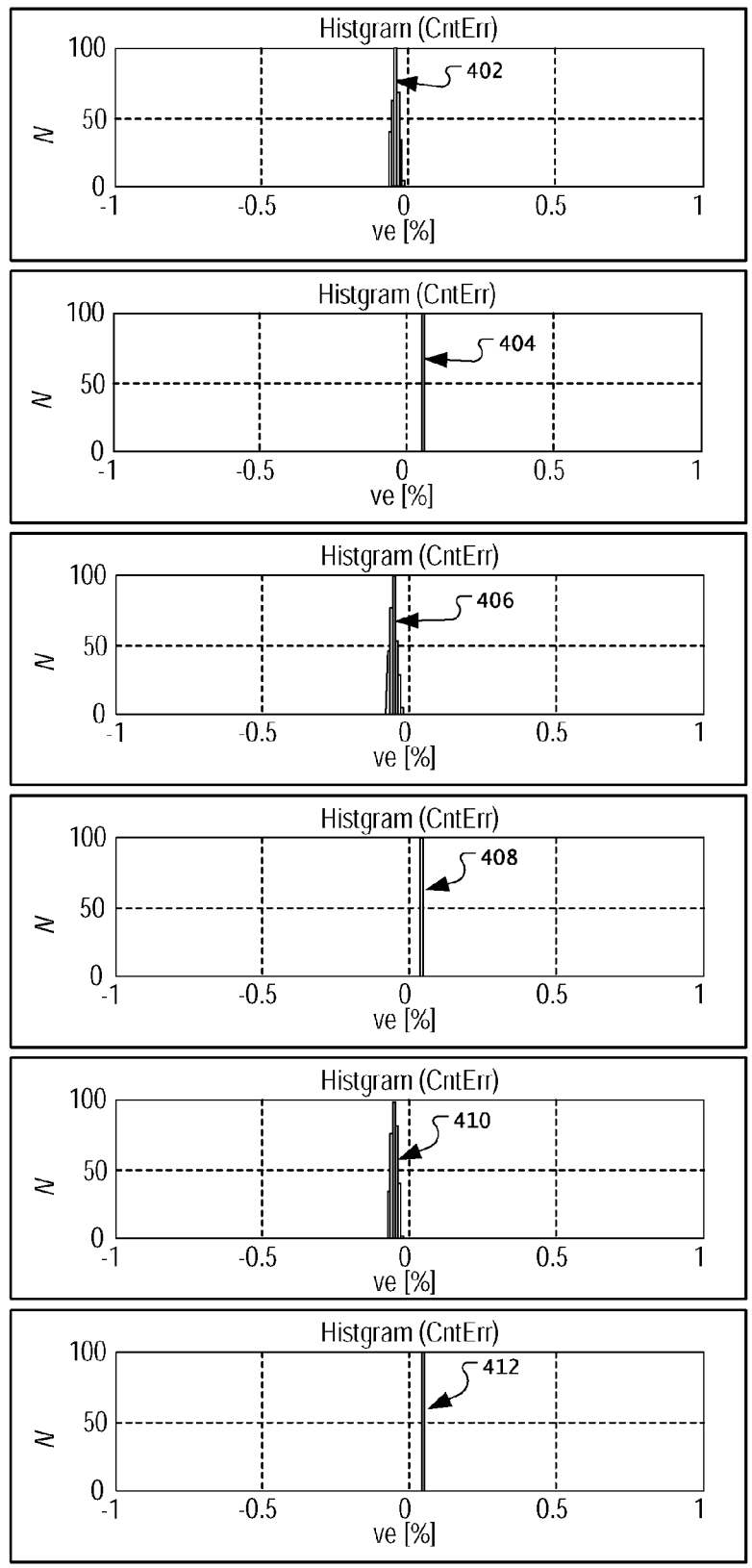
FIG. 4 shows an example of an alternating error pattern for a six-pole spindle motor caused by pole asymmetry.

At the second electrical cycle, the angular spacing between rotor poles 202 and 203 is greater than $\pi/3$ (i.e., the measured time is greater than $\tau_{Ref}/6$). The spindle motor control loop, once again, modifies the current on the windings to increase the rotational speed of the spindle motor 300. The subsequent speed adjustment, however, does not fully compensate for the previous erroneous speed adjustment, as the subsequent speed adjustment does not reflect the pole asymmetry associated with the second electrical cycle (e.g., does not reflect the angular spacing between rotor poles 202-203 being longer than $\pi/3$). Assuming the angular spacing between succeeding rotor poles 203-206 is also irregular (i.e., being greater or lesser than $\pi/3$), then the foregoing compensation process can result in an alternating pattern of increasing and decreasing the spindle motor speed throughout the entire mechanical cycle without ever reaching the target speed. This alternating pattern can generate a repeatable, alternating error pattern that can prevent the spindle motor control loop from performing effective and accurate speed control. FIG. 4 shows an example of such an alternating error pattern for a six-pole spindle motor caused by pole asymmetry.

As shown in FIG. 4, the error count for each pole at each electrical cycle is alternating about the zero reference point, indicating that the pole asymmetry is alternating between long and short electrical poles. Specifically, the error count 402 indicates the spindle motor is operating in the "negative" region (e.g., to the left of the zero reference point), meaning that the current speed trails the target speed by a "negative" non-zero rate. The slowness is attributable to a short electrical pole that causes the spindle motor control loop to reduce the spindle motor speed.

Since the spindle motor is operating at a speed slower than the target speed, the spindle motor control loop compensates the difference by increasing the current speed at the next electrical cycle. Because the error count 402 is due to pole mismatches and not deviation in actual speed, the speed adjustment to accelerate the spindle motor causes the spindle motor to operate at a speed faster than the desired speed. This is indicated by the error count 404, which shows that the spindle motor is driven at a rate faster than the target speed by a "positive" non-zero rate. This pattern repeats over the next four electrical cycles, as indicated by errors 406, 408, 410, 412. As is apparent, the errors 402-412 alternate about the zero point over the entire mechanical cycle, indicating that the pole mismatches alternate between long and short electrical poles (or between positive values and negative values).

To eliminate these alternating errors, in some implementations, the spindle motor speed can be down sampled every two electrical cycles (e.g., as counted by the electrical cycle counter 140). For example, after two electrical cycles, the spindle motor speed can be determined by using the angular spacing between rotor poles 201 and 202 and the angular spacing between rotor poles 202 and 203. In some implementations, the speed also can be down sampled after a full mechanical cycle (e.g., every six electrical cycles for a six-pole motor).

Down sampling the spindle motor speed every two electrical cycles allows positive and negative speed errors to substantially cancel one another. Using the example given above where the angular spacing between rotor poles 201 and 202 is less than π/3 and where the angular spacing between rotor poles 202 and 203 is larger than π/3, pole asymmetry would be equalized by determining the spindle motor speed at the end of the second electrical cycle (e.g., rotor pole 203). Determining the spindle motor speed every two electrical cycles allows negative speed errors (e.g., errors associated with the first electrical cycle as indicated by error count 402) and positive speed errors (e.g., errors associated with the second electrical cycle as indicated by error count 404) to cancel out each other, thereby reducing the possibility of over- (or under-) compensating the spindle motor speed without regard to the presence of pole asymmetry, and enhancing the speed control management of the spindle motor. Upon recognition by the controller 124 that the spindle speed is outside of a particular tolerance, speed adjustments can take place using the motor drive system 113 with increased confidence that the readings are a true reflection of the actual speed variation of the disc, and not due to pole asymmetry.

Figure 5:
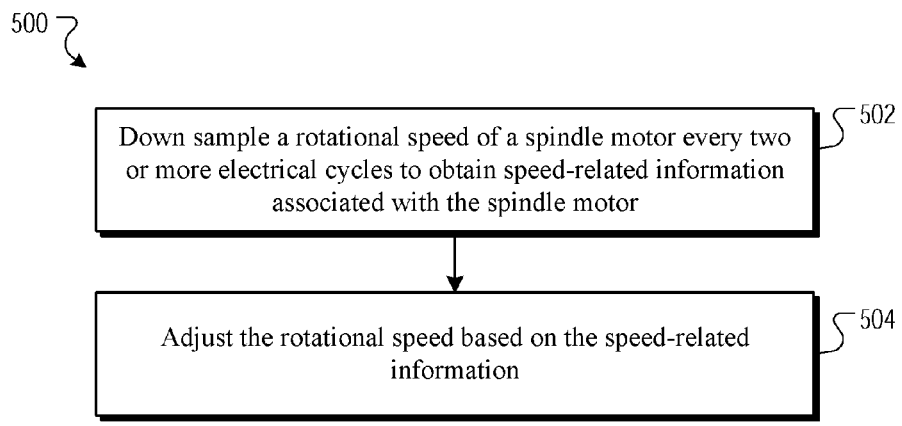
FIG. 5 shows a flow chart of an example process for down sampling spindle motor speed.

FIG. 5 shows a flow chart of an example process 500 for down sampling a rotational speed of the spindle motor. Process 500 can be performed, for example, by the disc drive system 100, and for clarity of presentation, the description that follows uses the disc drive system 100 as the basis of examples for describing process 500. However, another system, or combination of systems, can be used to perform process 500.

Process 500 begins with down sampling a rotational speed of a spindle motor every two or more (e.g., even) electrical cycles to obtain speed-related information associated with the spindle motor (502). As an example, every two electrical cycles, the down sample module 136 of the controller 124 can command the motor drive system 113 to determine the speed of the spindle motor 104 (e.g., via switched pulse width modulated signals 116, 118, and 120). Based on the speed-related information, the rotational speed of the spindle motor can be adjusted (504). For example, upon receiving the determined speed of the spindle motor 104, the speed adjustment module 138 can accelerate or decelerate the spindle motor 104 if the determined speed shows that the spindle motor 104 is moving above or below a target speed.

In some implementations, the speed-related information can include information indicative of pole asymmetry associated with the plurality of poles. For example, the controller 124 can receive signals indicative of BEMF induced on the windings of the poles from the BEMF sensing circuit 132. From the BEMF signals, zero crossings can be compared against reference information to determine the presence of pole asymmetry.

In some implementations, if the use of two or more electrical cycles does not completely cancel out the errors, the controller 124 can assume that the errors in fact have been canceled out because the residual error is generally small and negligible.

In some implementations, the ideal pole positions can be used as the reference information. As an example, for a six-pole motor, each of the six poles can correspond to a period T1-T6 (e.g., as measured between zero crossings), where each period is ideally separated by a duration of $\tau_{Ref}/6$ (e.g., where $\tau_{Ref}$ is one mechanical period or one revolution of the spindle motor). In the presence of pole asymmetry, the actual periods T1-T6 (which can be used to indicate the actual position information of each pole relative to another pole) can be measured (e.g., in sets of two if two electrical cycles are used), and the measured periods T1-T6 can be compared against the periods T1-T6 associated with the ideal pole positions. In some implementations, down-sampling also can be performed in the absence of pole asymmetry.

In other implementations, the reference information can be expressed in terms of ratios. For example, the ratios can be expressed in terms of the relationship of one period to other periods. These ratios also can be ratios of one period to an average (or ideal) period, although one particular period can be chosen as the reference period (e.g., assigned a ratio of 1) while other periods can be assigned with a ratio relative to the reference period.

Generally, if error still remains after down sampling the spindle motor speed, the residual error is minimal (or negligible) because the positive and negative speed errors substantially cancel out one another. As an example, error count 402 (negative speed errors) and error count 404 (positive speed errors) cancel each other out so that the determined speed at the end of two electrical cycles is at or around the zero reference point. Where the determined speed at the end of two electrical cycles deviates from the zero reference point, the speed adjustment module 138 can subsequently adjust the spindle motor speed based on the deviation (e.g., increase or decrease the spindle motor speed by an amount equal to the difference between the determined speed and the zero reference point). Accordingly, errors associated with pole asymmetry can be identified and removed from speed computation, thus enabling the controller 124 to determine a more accurate assessment of the rotational speed as well as provide an improved speed control management to the spindle motor 104.

Typical BEMF attributes used for speed control can include zero crossings of the BEMF signals, although other signal attributes (e.g., timing or position information) also can be used. The zero crossings can be used to determine the presence of pole asymmetry. For example, a zero crossing that is prematurely detected may indicate to the disc drive system 100 that the spindle motor speed has exceeded the target speed.

In some implementations, the speed-related information also can include information associated with a sequence of alternating speed errors resulting from the pole asymmetry.

For example, the speed-relation information can reveal the presence of the negative error count 402 and the positive error count 404. The negative error count 402 can arise during the first electrical cycle, and the positive error count 404 can arise during the second electrical cycle. At the end of the second electrical cycle, the controller 124 can determine the spindle motor speed. As discussed previously, the negative errors and the positive errors can cancel one another so as to substantially remove errors attributed to pole asymmetry. Since the errors are removed or substantially reduced, the accuracy of determining the spindle motor speed due to actual speed deviation is improved.

Down sampling the spindle motor speed also helps to stabilize the DAC 122. As discussed previously, the DAC 122 can receive digital reference signals from the controller 124 and output a corresponding analog current or voltage over a selected dynamic range (e.g., via the switch drive 128) for driving the spindle motor 104. The DAC 122 can be configured using one or more modes to output different analog current or voltage ranges to account for different resolution needs at different operating conditions. In the presence of pole asymmetry, the need to adjust the spindle motor speed increases, which can cause instability to the DAC 122. The instability can give rise to undesirable harmonic ripple and oscillation due to the frequent changing of the modes to accelerate or decelerate the spindle motor 104 (e.g., when the disc is spinning faster in some sections and slower in other sections). By down sampling the spindle motor speed every two or more (e.g., even) electrical cycles, the undesirable harmonic ripples and oscillation of the DAC 122 that are caused by frequent speed adjustments can be reduced (e.g., because the number of speed adjustment decreases), thus stabilizing the DAC 122 to provide effective speed control.

FIG. 6A shows example results of spindle motor speed control implemented without speed down sampling. Referring to FIG. 6A, as indicated by arrow 602, without down sampling the spindle motor speed, the time counter error becomes large, indicating the alternating timing error pattern present in the speed control. The time counter can start counting at the start of an electrical cycle and stop at the end of the electrical cycle (e.g., by detecting BEMF). The time counter error can be determined based on a difference between the current count number and a target speed reference count. As shown in the histogram indicating by arrow 604, without down sampling the spindle motor speed, a large distribution of errors is present about the zero mean value.

FIG. 6B shows example results of spindle motor speed control implemented with speed down sampling. Referring to FIG. 6B, as indicated by arrow 606, down sampling the spindle motor speed reduces the time counter error to essentially zero throughout the entire mechanical cycle. As shown in the histogram indicating by arrow 608, the large distribution of errors present in the histogram shown in FIG. 6A is notably absent, indicating the effectiveness of spindle motor speed control when the spindle motor speed is down-sampled.

Figure 7A:
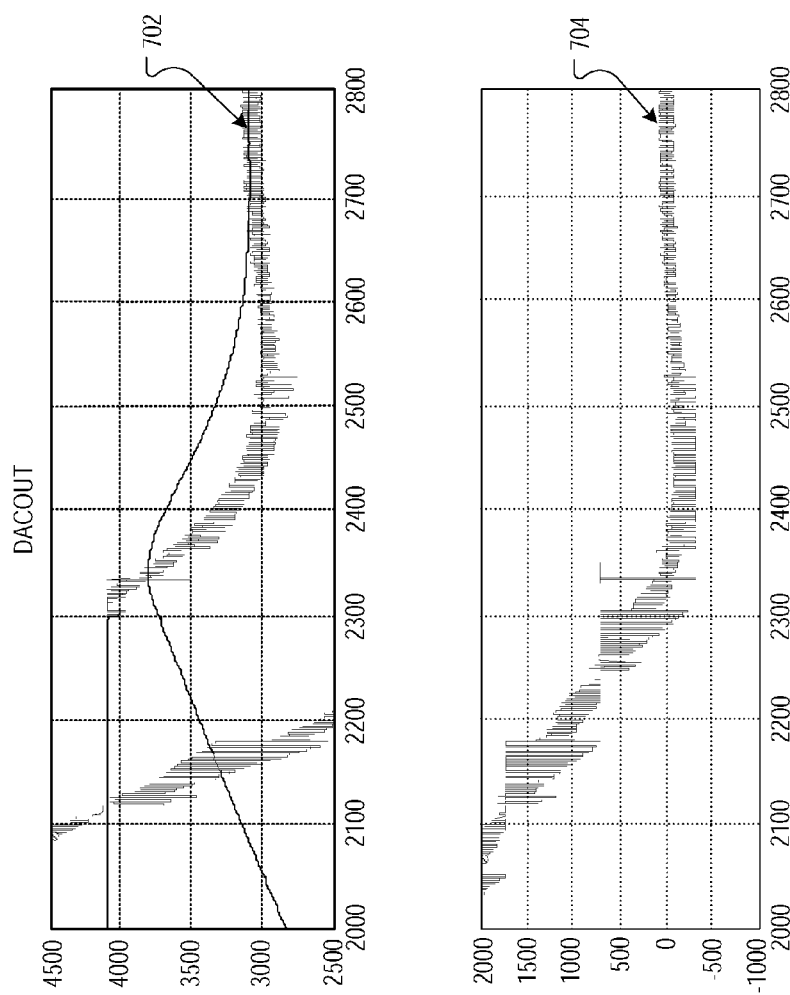
FIG. 7A shows example outputs of a digital-to-analog converter (DAC) when a spindle motor speed is not down sampled.

FIG. 7A shows example outputs of a DAC when a spindle motor speed is not down sampled. Referring to FIG. 7A, when the spindle motor speed is not down sampled, an inaccurate speed control loop can cause the DAC and its outputs to oscillate as indicated by arrow 702. A high number of closed loop samples also is needed in order to reduce the velocity error generated by the DAC resulting from the oscillation, as indicated by arrow 704.

Figure 7B:
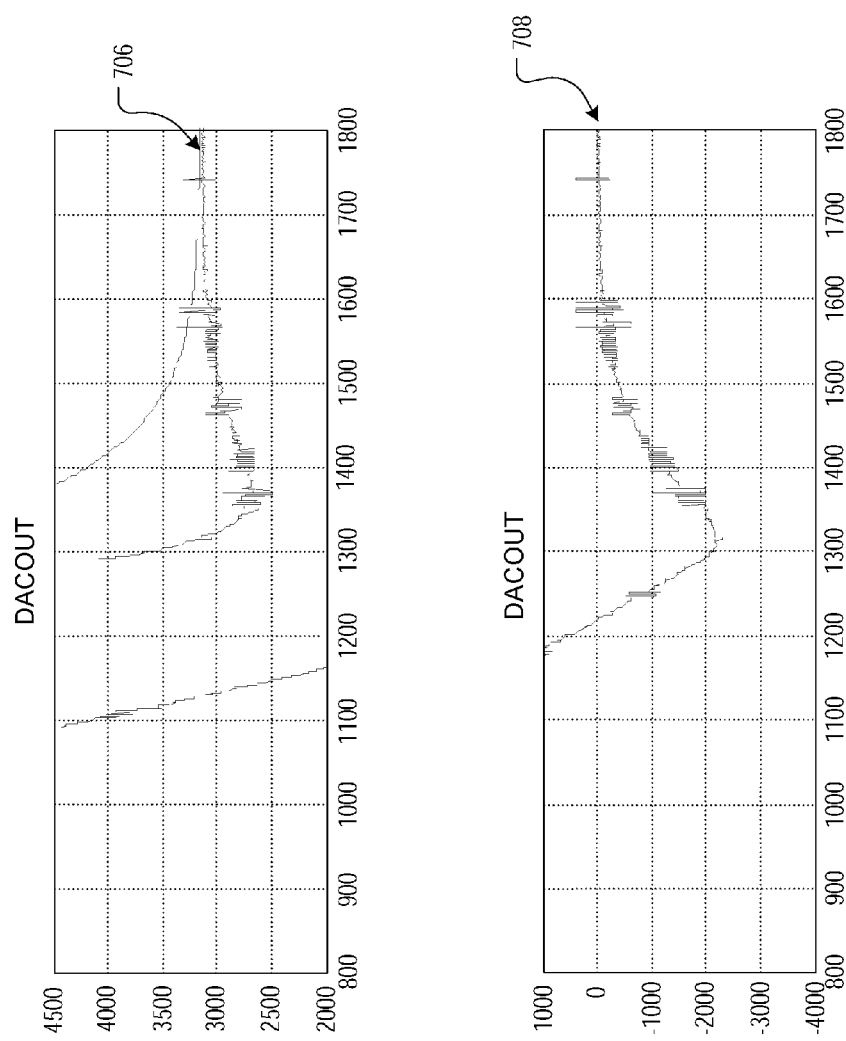
FIG. 7B shows example outputs of a DAC when a spindle motor speed is down sampled.

FIG. 7B shows example outputs of a DAC when a spindle motor speed is down sampled. Referring to FIG. 7B, with the spindle motor speed down sampled, a lower DAC romping (or DAC variation) and leveled DAC outputs are observed as indicated by arrow 706. Compared to the DAC outputs shown in FIG. 7A, the speed control loop needs a lesser number of closed loop samples to stabilize the DAC outputs as indicated by arrow 708.

While the foregoing implementations describe the use of two electrical cycles, one skill in the art would appreciate that the rotational speed also can be down sampled every three, four, five or six electrical cycles. The above implementations demonstrate one possible technique by which to identify and remove errors associated with pole asymmetry every two electrical cycles. However, one skill in the art would readily appreciate that more than two electrical cycles also can be used as can both positive and negative slope crossings.

As data density increases and the operating environment is subject to frequent vibrations, the tolerance for accurate spindle control is increasingly important. The subject matter described herein provides an accurate determination of spindle motor position and speed control, which enables the disc drive system 100 to precisely adjust the rotational speed in its response to spindle perturbations and speed errors resulting from pole asymmetry.

A few implementations have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof, including potentially a program operable to cause one or more data processing apparatus to perform the operations described (such as a program encoded in a computer-readable medium, which can be a memory device, a storage device, a machine-readable storage substrate, or other physical, machine-readable medium, or a combination of one or more of them).

The term "system" encompasses all apparatus, devices, and machines for processing data, including by way of example a programmable processor, a computer, or multiple processors or computers. The system can include, in addition to hardware, code that creates an execution environment for the computer program in question, e.g., code that constitutes processor firmware, a protocol stack, a database management system, an operating system, or a combination of one or more of them.

A program (also known as a computer program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A program can be deployed to be executed on one computer or on multiple computers that are located at one site or distributed across multiple sites and interconnected by a communication network.

While this specification contains many specifics, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations.

Other implementations fall within the scope of the following claims.

What is claimed is:

1. A method comprising:
receiving rotational speed information corresponding to a rotational speed of a spindle motor having a plurality of poles each corresponding to an electrical cycle for rotating a storage medium;
down sampling the rotational speed information every two or multiple of two electrical cycles to obtain speed-related information associated with the spindle motor; and
adjusting the rotational speed of the spindle motor based on the speed-related information.

2. The method of claim 1, where the speed-related information includes information indicative of pole asymmetry associated with the plurality of poles.

3. The method of claim 2, where the information indicative of pole asymmetry includes information associated with a sequence of alternating speed errors resulting from the pole asymmetry.

4. The method of claim 3, where the information associated with the sequence of alternating speed errors includes information indicative of a first speed error associated with a first electrical cycle and a second speed error associated with a second electrical cycle.

5. The method of claim 4, further comprising equalizing the first speed error and the second speed error to generate an equalized error,
where adjusting the rotational speed includes adjusting the rotational speed based on the equalized error.

6. The method of claim 4, where the first electrical cycle precedes the second electrical cycle.

7. The method of claim 1, where down sampling the rotational speed information includes down sampling the rotational speed information every full mechanical cycle.

8. The method of claim 1, where the speed-related information includes position information of the plurality of poles relative to each other; and
where adjusting the rotational speed includes adjusting the rotational speed based on the position information.

9. The method of claim 8, further comprising comparing the position information with reference information,
where adjusting the rotational speed includes adjusting the rotational speed based on a result of the comparing.

10. The method of claim 1, where the speed-related information includes information indicative of zero crossing variations associated with the plurality of poles; and
where adjusting the rotational speed includes adjusting the rotational speed based on the zero crossing variations.

11. A spindle motor controller comprising:
circuitry configured to receive rotational speed information corresponding to a rotational speed of a spindle motor having a plurality of poles each corresponding to an electrical cycle for rotating a storage medium;
circuitry configured to down sample the rotational speed information every two or multiple of two electrical cycles to obtain speed-related information associated with the spindle motor; and
circuitry configured to adjust the rotational speed based on the speed-related information.

12. The spindle motor controller of claim 11, where the speed-related information includes information indicative of pole asymmetry associated with the plurality of poles.

13. The spindle motor controller of claim 12, where the information indicative of pole asymmetry includes information associated with a sequence of alternating speed errors resulting from the pole asymmetry.

14. The spindle motor controller of claim 13, where the information associated with the sequence of alternating speed errors includes information indicative of a first speed error associated with a first electrical cycle and a second speed error associated with a second electrical cycle.

15. The spindle motor controller of claim 14, further comprising circuitry configured to equalize the first speed error and the second speed error to generate an equalized error; and
where the rotational speed is adjusted based on the equalized error.

16. The spindle motor controller of claim 14, where the first electrical cycle precedes the second electrical cycle.

17. The spindle motor controller of claim 11, where the circuitry configured to down sample the rotational speed information is configured to down-sample the rotational speed information every full mechanical cycle.

18. The spindle motor controller of claim 11, where the speed-related information includes position information of the plurality of poles relative to each other; and
where the rotational speed is adjusted based on the position information.

19. The spindle motor controller of claim 18, where the circuitry configured to down sample the rotational speed information is further configured to compare the position information with reference information; and
where the rotational speed is adjusted based on the comparison.

20. The spindle motor controller of claim 11, where the speed-related information includes information indicative of zero crossing variations associated with the plurality of poles; and
where the rotational speed is adjusted based on the zero crossing variations.

21. A system comprising:
a spindle motor having a plurality of poles each corresponding to an electrical cycle; and
a spindle motor controller to control the spindle motor, the spindle motor controller configured to:
down sample a rotational speed of a spindle motor every two or multiple of two electrical cycles to obtain speed-related information associated with the spindle motor; and
adjust the rotational speed based on the speed-related information.

* * * * *